United States Patent [19]

Ramnarine

[11] Patent Number: 4,888,192

[45] Date of Patent: Dec. 19, 1989

[54] METHOD FOR EXTRUSION OF BAKED GOODS

[75] Inventor: Wayne D. Ramnarine, Bergenfield, N.J.

[73] Assignee: Nabisco Brands, Inc., East Hanover, N.J.

[21] Appl. No.: 296,888

[22] Filed: Jan. 12, 1989

Related U.S. Application Data

[60] Continuation of Ser. No. 68,175, Jun. 30, 1987, abandoned, which is a division of Ser. No. 837,003, Mar. 5, 1986, Pat. No. 4,698,004.

[51] Int. Cl.⁴ .......................... A23P 1/12; A23P 1/14
[52] U.S. Cl. .................................... 426/448; 426/94; 426/283; 426/284; 426/516
[58] Field of Search ............... 426/94, 284, 283, 516, 426/448

[56] References Cited

U.S. PATENT DOCUMENTS

| | | | |
|---|---|---|---|
| 2,722,177 | 11/1955 | Routh | 107/1 |
| 2,737,374 | 3/1956 | Terrett | 261/9 |
| 2,811,117 | 10/1957 | Monaco | 107/1 |
| 2,859,476 | 11/1958 | Lainson | 18/13 |
| 3,241,503 | 3/1966 | Schafer | 107/1 |
| 3,314,381 | 4/1967 | Fries et al. | 107/1 |
| 3,351,026 | 11/1967 | Hayashi | 107/68 |
| 3,447,204 | 6/1969 | Lainson | 18/14 |
| 3,572,259 | 3/1971 | Hayashi | 107/68 |
| 3,583,680 | 6/1971 | Ratingen et al. | 259/7 |
| 3,606,635 | 9/1971 | Benteler et al. | 18/13 H |
| 3,615,675 | 10/1971 | Wisdom et al. | 426/284 |
| 3,653,336 | 4/1972 | Kaneko et al. | 425/133 |
| 3,679,338 | 7/1972 | Lutz | 425/131 |
| 3,840,311 | 10/1974 | Wight | 425/133 |
| 3,851,084 | 11/1974 | Rossen et al. | 426/343 |
| 3,886,973 | 6/1975 | Kinney | 137/604 |
| 3,917,863 | 11/1975 | Kaufman, Jr. et al. | 426/283 |
| 3,945,785 | 3/1976 | Belshaw et al. | 425/132 |
| 3,947,178 | 3/1976 | Belshaw et al. | 425/132 |
| 4,028,024 | 6/1977 | Moreland | 425/133.1 |
| 4,054,271 | 10/1977 | Lanzillo | 366/70 |
| 4,113,819 | 9/1978 | Hayashi et al. | 264/173 |
| 4,209,536 | 6/1980 | Dogliotti | 426/94 |
| 4,217,083 | 8/1980 | Machuque | |
| 4,251,201 | 2/1981 | Krysiak | 425/132 |
| 4,259,051 | 3/1981 | Shatila | 425/133.1 |
| 4,266,920 | 5/1981 | Hayashi et al. | 425/133.1 |
| 4,293,572 | 10/1981 | Silva et al. | 426/19 |
| 4,343,603 | 8/1982 | Pavlow et al. | 425/114 |
| 4,344,969 | 8/1982 | Youngquist et al. | 426/18 |
| 4,356,202 | 10/1982 | Todd | 426/138 |
| 4,360,534 | 11/1982 | Brabbs et al. | 426/560 |
| 4,401,681 | 8/1983 | Dahle | 426/94 |
| 4,416,910 | 11/1983 | Hayashi et al. | 426/502 |
| 4,455,333 | 6/1984 | Hong et al. | 426/94 |
| 4,469,475 | 9/1984 | Krysiak | 425/132 |
| 4,486,163 | 12/1984 | Pfeilstetter | 425/133.1 |
| 4,503,080 | 3/1985 | Brabbs et al. | 426/94 |
| 4,511,318 | 4/1985 | Kolodesh et al. | 425/133.1 |
| 4,528,900 | 7/1985 | Simelunas | 99/450 |
| 4,534,726 | 8/1985 | Simelunas | 425/363 |
| 4,569,848 | 2/1986 | Giorgetti et al. | 426/94 |
| 4,578,027 | 3/1986 | Koppa et al. | 425/298 |
| 4,579,744 | 4/1986 | Thulin et al. | 426/283 |
| 4,748,031 | 5/1988 | Koppa | 426/284 |
| 4,794,009 | 12/1988 | Dreisin | 426/283 |

FOREIGN PATENT DOCUMENTS

| | | |
|---|---|---|
| 417570 | 7/1968 | Australia . |
| 0031718 | 7/1981 | European Pat. Off. . |
| 0130748 | 1/1985 | European Pat. Off. . |
| 0153094 | 2/1985 | European Pat. Off. . |
| 0162675 | 11/1985 | European Pat. Off. . |
| 0168255 | 1/1986 | European Pat. Off. . |
| 2556254 | 12/1976 | Fed. Rep. of Germany . |
| 1253104 | 11/1971 | United Kingdom . |

OTHER PUBLICATIONS

"Extruded Crisp Bread Fast Mover in Europe," *Snack Food*, (Oct. 19, 1982), pp. 28 & 30, English Translation of Offenlegungsschrift 25 56 254.

*Primary Examiner*—Donald E. Czaja
*Assistant Examiner*—Mary S. Mims
*Attorney, Agent, or Firm*—Richard Kornutik

[57] ABSTRACT

A nozzle permits extrusion of an outer, expanded dough layer having two filler materials co-extruded therewith. An adjusting mechanism is provided for precisely locating two filler injection conduits with a surrounding guide nozzle. A pillow-shaped final product is formed, having an outer layer of expanded dough and two different filler materials.

10 Claims, 3 Drawing Sheets

METHOD FOR EXTRUSION OF BAKED GOODS

Cross Reference To Related Applications.

This aplication is a continuation of Ser. No. 068,175 filed June 30, 1987, now abandoned which is a divisional application of Ser. No. 837,003 filed Mar. 5, 1986 now U.S. Pat. No. 4,698,004.

BACKGROUND OF THE INVENTION

The present invention relates to a process and apparatus for extruding an expansible dough, particularly for yeast dough goods, crisp breads and puffed breakfast cereals.

The present invention provides an extruded rope composed of three separate materials, for example, an outer expanded crispy layer and two different non-dough filler materials. The fillers are substantially non-expanded and their location within the outer dough layer is adjustable.

U.S. Pat. Nos. 4,113,819, 4,266,920 and 4,416,910, all to Hayashi et al., describe apparatus and processes for manufacturing multi-layered dough materials comprising layers of dough and fat or oil, such as butter. These processes involve co-extrusion of dough and fat through a die having concentric annular orifices to form a hollow tube in which an inner layer of fat is surrounded by an outer layer of dough. In U.S. Pat. Nos. 4,413,819 and 4,416,910, this tube is then collapsed under its own weight onto a first conveyor, which passes it under a rolling assembly comprising a plurality of rolls which are themselves carried around an endless belt. At the end of the first conveyor, the rolled sheet passes downwardly to an oscillating chute, which oscillates parallel to the direction of motion of the first conveyor, and are formed into a pile, comprising multiple plies of the sheet, on a second conveyor, which conveys it under a second rolling assembly generally similar to the first one already described.

In the apparatus shown in U.S. Pat. Nos. 4,113,819 and 4,416,910, both orifices of the co-extrusion die are annular. The patents discuss the possibility of using a die having orifices of flattened or rectangular form, but state that, since the elevation angles of various portions of the inner faces of the nozzles are considerably different from each other because of the required changes in the cross-section of the channels used to feed material to the orifices of such a flattened die, such flattened or rectangular orifices are to be avoided because the discharge speed is different between the middle and end portions of the rectangular orifices. Such changes in discharge speed would result in non-uniformity of the thickness of the layers of fat and dough forming the co-extruded tube, and might result in distortion or rupture of the tube. Also, if in accordance with the teachings of these patents' annular dies producing a hollow cylindrical tube are used, and if this tube is to have the diameter desirable to produce a sheet of the desired width for high-speed production, the dies required are extremely large, cumbersome and expensive to form.

U.S. Pat. No. 3,572,259 to Hayashi discloses a process in which a cylinder of dough filled with a filler is co-extruded in the same manner as in U.S. Pat. No. 4,113,819, and the co-extruded cylinder is thereafter formed into double-layered spheres. A similar method, not restricted to the co-extrusion technique of U.S. Pat. No. 4,113,819, is disclosed in U.S. Pat. No. 3,351,026 to Hayashi.

Other types of devices for providing additional material to a co-extruded product, are discussed as follows.

Moreland, in U.S. Pat. No. 4,028,024 teaches manufacture of filled capsules using a co-extruder. The product formed by this co-extruder is a capsule having a medicament or edible substance encased in a casing formed of gelatin or dough. The capsule may be a single color or may have different colors on opposite sides of a single capsule. This two-colored capsule is formed in the extruder by using different colored materials in conduits 13,14 of the apparatus of FIG. 4. As seen in this figure, the core material enters through an orifice 61 surrounded by a body part 59 having inlet openings on opposite sides thereof. This permits entry of the two differently colored materials on opposite sides of the orifice 61, with a body part 69 causing merging of the inner and outer layers into a single co-extrudate body. While three conduits are provided, only two materials are taught, having a total of potentially three different colors.

In U.S. Pat. No. 3,314,381 to Fries et al., an apparatus is shown for filling baked products. The "co-extrudate" product formed is in fact an extruded material forming the interior and the exterior material portions of the final extrudate product. A second material is injected into the body of the first material during extrusion thereof by a spiral-shaped member having a plurality of orifices therein, to release a second material in a spiral-shaped pattern into the first material.

Extruders currently used for processing yeast dough, crisp breads and puffed breakfast cereals are known and generally comprise one or more feed hoppers which regulate the dry ingredients fed into a twin screw cooker/extruder where water is directly added to the dry ingredients by means of a metering pump.

U.S. Pat. No. 4,217,083 to Machuque discloses a complete baking-extrusion-expansion process as shown in FIG. 1, with the extrusion head being the novelty of the invention. The extrusion head has a horizontal slot from which dough is extruded onto two pivotable extension bars. Also, note straps 22 of FIG. 6.

The article entitled "EXTRUDED CRISP BREAD FAST MOVER IN EUROPE", published in the magazine *Snack Food*, Oct. 19, 1982, discusses a twin screw cooker-extruder in which dough is extruded horizontally and passed onto a gauge roll which feeds to the cutter.

Because texture and shape are highly important in the manufacturing of food, and particularly for dough products, it is particularly important to maintain rigid controls upon the final end product. Sporadic surging of dough or filler material from a die head and extreme expansion of dough result in final products which are non-uniform in thickness and shape and in degree of expansion.

When occluded gas escapes from the extruded dough, a cellular textured product results. The cellular texture disperses the light impinging on the final product causing a lighter color as compared to a surface which is non-cellular or in which the cellular formation is not uniform. Therefore, extruded baked doughs which do not possess a uniform cellular structure do not exhibit a consistent uniform color from side to side.

SUMMARY OF THE INVENTION

The present invention teaches an apparatus for providing a co-extruded product, and also teaches a particular type of co-extruded product formed by the abovementioned apparatus, wherein two different fillings are co-extruded within an outer expansible dough which expands uniformly upon extrusion. The fillings do not expand significantly, and the extruded product is pinched and/or cut to form pillow-shaped articles.

The present invention includes a nozzle having an inlet portion for receiving a dough under pressure, the dough being an expansible dough when released to atmospheric pressure. The nozzle has an outlet portion for the expansible dough, which surrounds a pair of tubes. Each tube is adapted for injecting an edible material, such as jelly, peanut butter, fruit fillings, vegetable fillings, cheese fillings, and other fillings, inside the surrounding expansible dough. The tubes extend completely through the nozzle body, and are adjustable by means of a plurality of set screws.

The resultant extrudate product is pinched and cut by a cutter to form pillow-shaped articles having an outer, expanded uniformly shaped layer, with a uniform cellular structure and two inner fillings. The set screws permit adjustment of the pair of nozzles disposed within the outer casing, such that the inner fillings can be precisely centered and adjusted to provide the desired final product.

DETAILED DESCRIPTION OF THE INVENTION

Figure 1:
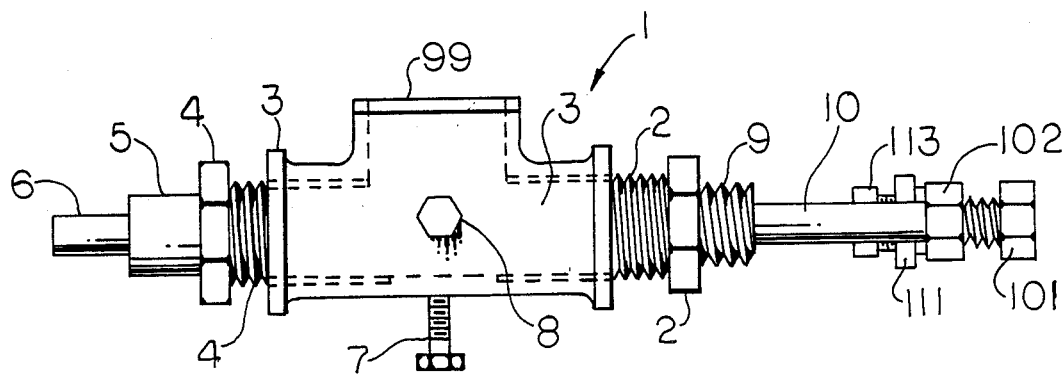
FIG. 1 is a side elevational view of a nozzle according to the present invention.

FIG. 1 is a front elevational view of a nozzle 1 according to the present invention. A nozzle body 3 has a left end and a right end, the left end having a threaded bore receiving a plug 4, and the right end of the body 3 having a threaded barrel for receiving a plug 2.

The plug 2 in turn receives a threaded member 9 into which a pair of tubes 10, 11 (tube 11 being shown in subsequent drawings) have been fixedly attached, and which member is filled-in around the tubes 10, 11 to prevent any fluid flow through the plug 9, except through tubes 10, 11. As seen in FIG. 1, the tube 10 has a threaded coupling 102 which is connected to another threaded coupling 101 which in turn can be connected to a supply of fluent edible material.

The couplings 111, 113 are connected to the conduit 11, which is not visible in FIG. 1. A set screw 7 is readily engaged through a wall of the body 3. Where the screw 7 enters the body 3, the body 3 is threaded so as to permit a snug, threaded engagement between the screw 7 and the body 3. The same is true of the screw 8, which penetrates a wall of the body 3, the wall of the body 3 being threaded to receive the set screw 8.

The body 3 has an open top 99, the top 99 comprising a circular opening for admitting expansible dough therethrough. The top may be attached to a conventional cooking extruder which supplies the expansible dough to the open top. The expansible dough received through the opening 99 is extruded under pressure through a shaped guide 5, the shaped guide 5 being fixedly connected as by welding or the like to the connecting member 4. A conduit 6 passes through the guide 5 and extends beyond it to the left as seen in FIG. 1.

Figure 2:
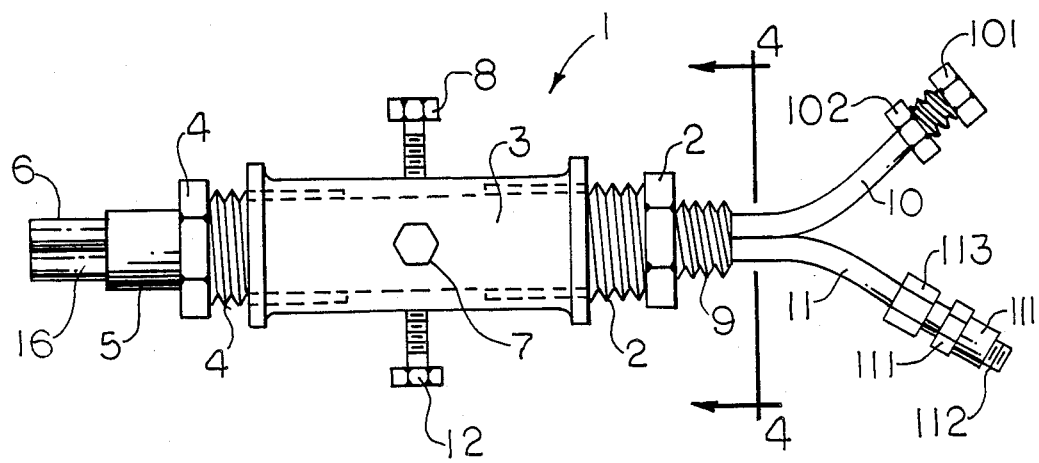
FIG. 2 is a bottom elevational view of the nozzle of FIG. 1.

FIG. 2 is a bottom elevational view of the nozzle 1 according to the present invention. Here, an additional set screw 12 can be seen, which also passes through a wall of the body 3. The wall of the body 3 is threaded to receive the set screw 12 in snug, threaded engagement. As seen in FIG. 2, a second conduit 16 is clearly visible, the second conduit 16 being welded to the conduit 6 to assure precise location of the conduit 6 and 16 relative to one another. Also as seen in FIG. 2, along the right-hand portion of the plug 9, nozzles 10 and 11 diverge. The nozzles 10 and 11 correspond respectively to the conduits 6 and 16, and in fact are integral with the respective ones of the conduits 6 and 16. As seen in dotted outline, the conduit 6 continues through the body 3 until it reaches a bent portion 10. Similarly, the conduit 16 as seen in dotted outline of FIG. 2 passes through the valve body 3 and is bent to form the right-hand end 11.

The conduit 11 can receive a first edible substance at the open coupling end 112. The conduit 10 can receive a second edible substance through the open end of the coupling 101. Such edible substances may include, but are not limited to, peanut butter, jelly, chocolate, ground vegetables or fruits, fig filling, candy, cheese fillings, and the like.

Figure 3:
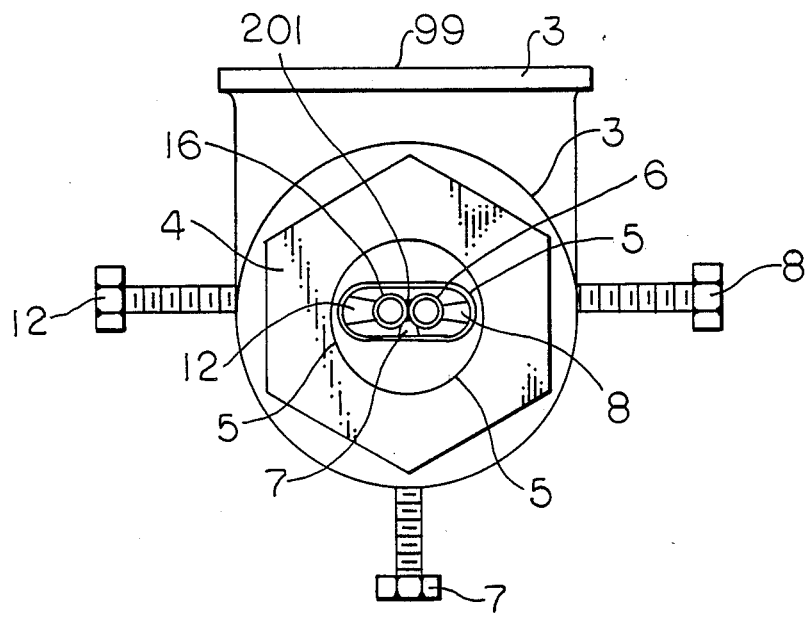
FIG. 3 is a left-hand elevational view of the nozzle of FIG. 1.

FIG. 3 is a left-hand elevational view as seen from the left-hand side of FIG. 1. Here, the oblong guide 5 is clearly seen having the pair of conduits or nozzles 6, 16 generally centered within the nozzle guide 5. The nozzle guide 5 is formed from a generally cylindrical section of pipe as suggested by the circular outline of the material 5 in FIG. 3. An end of the pipe is then crushed about a form so as to form the oblong shape shown in FIG. 3 having the terminal edge 5. As seen in FIG. 3, the metal of guide 5 is deformed from a circular configuration at the end joined to the coupling 4, and which is welded to the oblong end section, to the shape formed by the oblong end of guide 5.

The tips of the set screws 7, 8, and 12 are seen in contact with the conduits 6 and 16. A welded portion 201 welds the conduits 6 and 16 together as seen in FIG. 3. The set screws 7, 8, and 12 are used to guide the conduits 6 and 16 so that they are generally centered within the conduit 5. This is highly desirable and advantageous, since very precise adjustments may be necessary depending upon the types and the amounts of the fluent material transported by the conduits 6 and 16. Movement of the conduits 6 and 16 as a unit to the left, right, up, or down may be necessary to compensate for the effects of the fluid flow as the expansible fluid flows around the conduits 6 and 16, and of the material flowing through the conduits 6 and 16 centered within the surrounding expansible dough.

Figure 4:
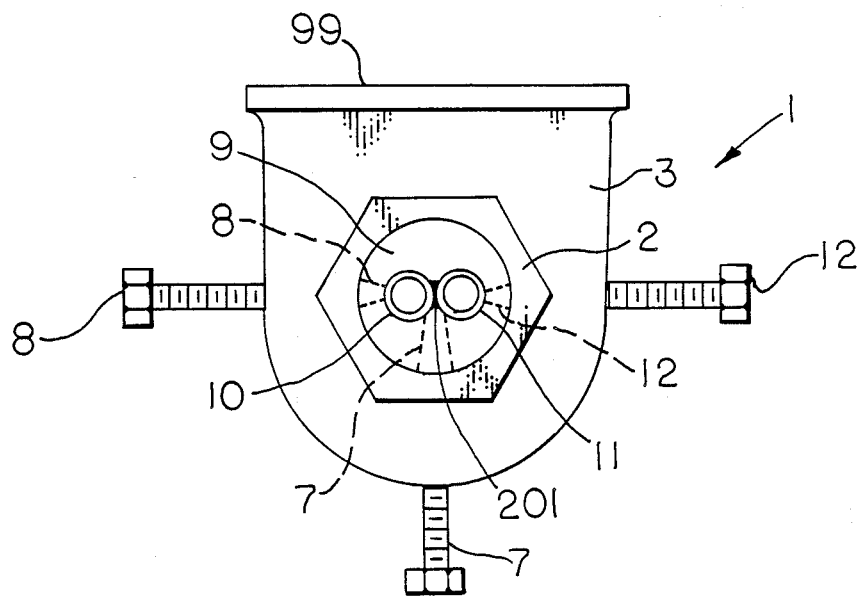
FIG. 4 is a sectional view taken along line 4—4 of FIG. 2.

The nozzle 1 is seen in a right-hand side sectional view taken along line 4—4 of FIG. 2. Here, it is clearly seen that the end plug 9 completely seals the surrounding area about the conduits 10, 11 so that no fluid or fluent material can escape through the plug 9. The set screws 7, 8, and 12 are visible as extending beyond the edges of the valve body 3 in FIG. 4.

Figure 5:
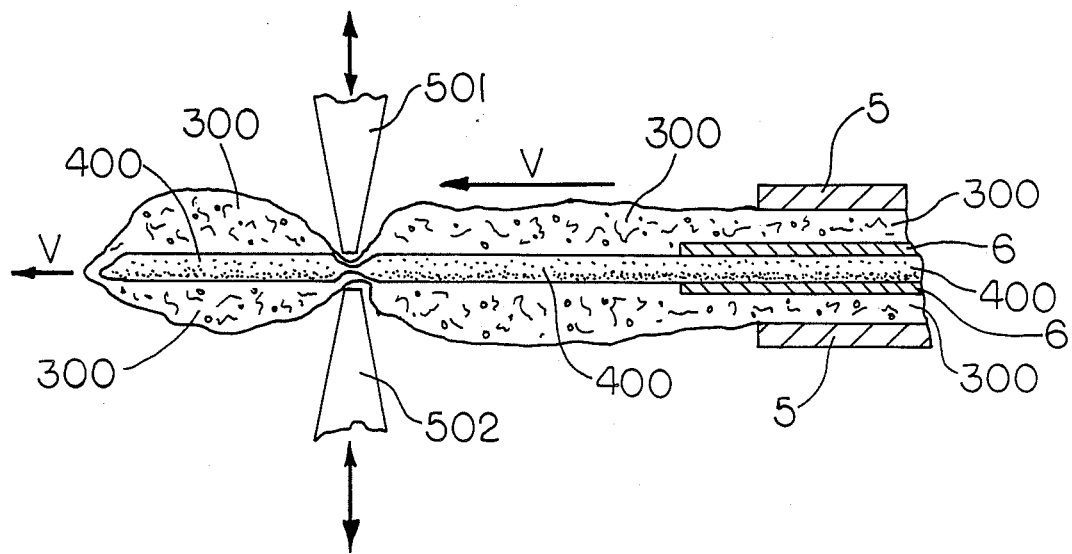
FIG. 5 is a sectional view showing the operation of the nozzle in extruding products therethrough.

FIG. 5 is a side view, partially in section, showing the extrusion nozzle of the present invention in combination with a cutting/pinching device for forming a final product from the dough and fillers of the present invention. Here, an expansible dough 300 expands as it leaves the guide 5. The dough 300 expands and forms small porous enclosures containing air and is initially relatively soft until it cools and dries. Inside, a filling 400 is seen being extruded through a nozzle 6. A pair of pinching members 501, 502 reciprocate in timed and synchronized relationship indicated by the double-headed arrows in FIG. 5. These pinching members 501, 502 pinch the extrudate, which extrudate moves at velocity V as indicated by the arrows in FIG. 5, at regular intervals to form the pillow-shaped articles.

Figure 6:
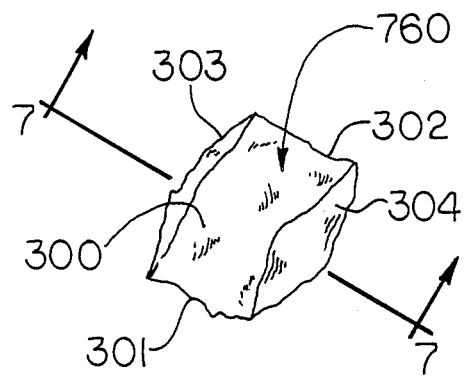
FIG. 6 is a pillow-shaped final article formed according to the present invention.

A final sample product according to the present invention is indicated as article 760 in FIG. 6. The article 760 has pinched ends 301, 302 which are generally linear. The article 760 has generally curved and pillow-shaped sidewalls 303 and 304. The expanded dough 300 encapsulates substantially entirely the filler materials 400, 500.

Figure 7:
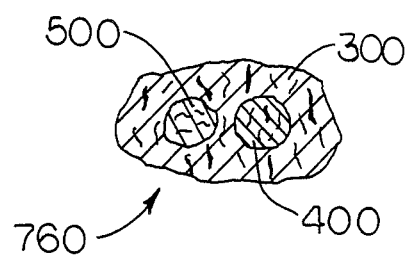
FIG. 7 is a sectional view taken along line 7—7 of FIG. 6.

FIG. 7 is a side sectional view of the article 760 taken along line 7—7 of FIG. 6. Here, a pair of filler materials 400, 500 is clearly visible. The filler material 400 was injected through the nozzle 6, while the filler material 500 was injected through the nozzle 16. As seen in FIG. 7, the expansible dough 300 completely surrounds the filler materials 400, 500. By angling or tapering of the ends of conduits 6 and 16 and adjusting the distances between the openings of conduits 6 and 16, the two filler materials may be extruded to provide a final product with the fillers in contact with each other or separated by dough.

The set screws as seen in FIGS. 1-4 of the present invention, are used to adjust the location of the filler materials 400, 500 relative to the surrounding expansible dough 300. The filler materials 400 or 500, may tend to relocate so that they are not generally centered and in fact may even penetrate through, at least partially, a side wall of the final articles 760. Such penetration or unevenness is highly undesirable in a finished food product, wherein uniformity and attractiveness of appearance are valuable qualities. Therefore, the adjustments made possible by the set screws 7, 8, and 12 are essential to obtaining a desired final product.

The improved nozzle of the present invention is capable of achieving the above-enumerated advantages and results, and of producing the above-described article, and while preferred embodiments of the present invention have been disclosed, it will be understood that it is not limited thereto but may be otherwise embodied within the scope of the following claims.

What is claimed is:

1. A method of making a light, expanded center filled product comprising the steps of:
    (a) selecting an expansible outer dough material and at least one essentially non-expandable filler material;
    (b) simultaneously introducing said outer dough and filler material to an extrusion nozzle comprising a body receiving a first conduit defining an extrusion orifice for the outer dough and at least one second conduit adjustably disposed within the first conduit and defining an extrusion orifice for the filler material, said extrusion nozzle further including threaded adjustment screws to adjust the axial position of the second conduit with respect to the first conduit,
    (c) adjusting the threaded adjustment screws to position said second conduit within the first conduit whereby said inner material is completely enrobed by the outer dough on extrusion;
    (d) coextruding the outer dough and inner material to produce an extrudate having the filler material completely enrobed by the outer dough; and
    (e) severing the extrudate into predetermined lengths.

2. The method of claim 1 comprising pinching the extrudate at pre-selected intervals to sever into predetermined lengths.

3. The method of claim 1 wherein said outer dough is extruded through said extrusion nozzle under sufficient pressure whereby the dough expands when released from the extrusion nozzle.

4. A method of producing a light expanded center filled product comprising the steps of:
    (a) selecting an expansible outer dough and two essentially non-expansible inner filler materials,
    (b) introducing the outer dough and the inner filler materials to an extrusion nozzle wherein said outer dough is introduced to a first conduit defining an extrusion orifice disposed within a housing and introducing said filler materials to a pair of parallel second conduits adjustably disposed axially within the first conduit defining extrusion orifices for said filler materials, said extrusion nozzle further including threaded adjustment screws in said housing to adjust the axial position of the second conduits with respect to the first conduit;
    (c) adjusting the threaded adjustment screws to position said second conduits within the first conduit whereby said inner filler materials are spaced apart and completely enrobed by the outer dough on extrusion;
    (d) coextruding the outer dough and inner filler materials to produce an extrudate comprising said filler materials enrobed by the outer dough; and
    (e) severing the extrudate into predetermined lengths.

5. The method of claim 4 wherein the coextruding step (d) comprises extruding two different materials.

6. The method of claim 4 wherein said extrudate is severed by pinching the extrudate at preselected intervals.

7. The method of claim 4 comprising extruding the outer dough under sufficient pressure whereby the outer dough expands when released from the extrusion nozzle.

8. The method of claim 4 comprising adjusting said second conduit radially within the first conduit whereby the inner filler materials are completely enrobed on extrusion.

9. The method of claim 4 comprising the step of cooking said outer dough prior to introducing the outer dough to said extrusion nozzle.

10. The method of claim 9 comprising cooking said outer dough under sufficient heat and pressure to entrap sufficient air whereby said dough expands on the sudden release of pressure.

* * * * *